Patented Nov. 28, 1933

1,936,989

UNITED STATES PATENT OFFICE

1,936,989

NITRATED CARBOHYDRATE SOLUTION

Garrett H. Peters, Wilmington, Del., assignor to Hercules Powder Company, Wilmington, Del., a corporation of Delaware No Drawing. Application July 8, 1927
Serial No. 204,417

4 Claims. (Cl. 134—79)

My invention relates to an improvement in nitrated carbohydrate solutions and more particularly to a method of preparation of solutions of nitrated cellulose, nitrated starch and the like.

Heretofore in the preparation of nitrated carbohydrate solutions it has been essential that the nitrated carbohydrate, as nitrated cellulose, nitrated starch, and the like, be dry, that is substantially freed from water, since water has the effect of precipitating nitrated carbohydrates from a solution thereof with the result that when it is used as a lacquer, leather solution, etc., a whitish film is produced. Further, even though the nitrated carbohydrate used for the production of a solution be entirely free from water, an entirely satisfactory film cannot always be produced since on drying a film formed with such a solution, and which is accomplished by evaporating off the volatile ingredients of the solution, the temperature of the air adjacent the surface of the film is lowered with the result that when the relative humidity of the surrounding air is high water is precipitated from the air and entering the film may precipitate nitrated carbohydrate, causing the film to blush.

In order to free nitrated carbohydrates, intended for use in solutions, from water various dehydration processes have been practiced at a substantial increase in the cost of production of the nitrated carbohydrate. For example, in the case of nitrated cellulose, as nitrocotton, after the nitrocotton has been washed with water, in the completion of its production, the excess water is removed by mechanical means and the nitrocotton is then dehydrated by percolation with alcohol, which acts to displace the remaining water. A certain quantity of the alcohol is permitted to remain in the nitrocotton in order to reduce the inflammability of the nitrocotton, which, as is well known is very highly inflammable when in a dry state. The alcohol left in the nitrocotton necessarily enters into such solution as the nitrocotton is used for producing and while the alcohol has displaced all water from the nitrocotton, since it is highly hygroscopic, it acts, when the solution is dried, to effect the precipitation of moisture from the air with blushing of the film.

Thus, heretofore, it has been deemed essential to remove all water from nitrated carbohydrates intended for use in the production of solutions, such as lacquer, leather solution or the like, and it has been found impractical even under carefully controlled conditions, to entirely avoid blushing of the film produced under such solutions, due to the effect of the precipitation of moisture from the air on drying of the film.

Now, in accordance with my invention, I have discovered that water carried by a nitrated carbohydrate, as nitrated cellulose, nitrated starch and the like, may be readily eliminated therefrom without preliminary treatment of the nitrated carbohydrate after the formation of a solution thereof, as a lacquer, leather solution, etc. Further, in accordance with my invention the water is eliminated prior to the application of the solution, or in the drying of a film thereof; and the solution formed in accordance with my invention will be free from blushing caused by the precipitation of moisture from the air or from contained water.

According to my invention a nitrated carbohydrate, as nitrated cellulose, nitrated starch, or the like, from which excess water, such as can be removed by mechanical means, as by centrifugation or pressing, has been removed, is admixed with a solvent which is substantially immiscible with and insoluble in water. To the mixture may be added, if desired, a diluent which is substantially immiscible with and insoluble in water. The mixture is agitated to cause the nitrated carbohydrate to be dissolved by the solvent and at the same time to cause the water to form an emulsion with the solution. The water may then be removed from the solution by centrifuging or by adding an anhydrous hygroscopic salt which will absorb water, agitating and separating the salt by settling or filtering, or by any of the methods commonly used to break emulsions.

In accordance with my invention any suitable solvent for the nitrated carbohydrate, such as, for example, butyl acetate, amyl acetate, butyl propionate, etc., may be used so long as it is immiscible with water, and any suitable diluent such as toluol, mineral spirits, turpentine, etc., which is immiscible with water may be used. In accordance with my invention other ingredients, in addition to solvent and diluent, may be added to the solution in order to adapt it to my particular use, for example, as a lacquer, leather solution, or the like.

In the carrying out of the method embodying my invention as, for example, the production of a solution of the character indicated for use as a lacquer and using, for example, nitrated cotton, the following ingredients are mixed:

10½ parts nitrocotton (dry basis)
4½ parts water carried by the nitrocotton
30 parts butyl acetate
42½ parts toluol
7½ parts ester gum
5 parts tricresyl phosphate The ingredients, as above, are agitated until the nitrocotton and gum are dissolved. As a result of the agitation the water, which as has been indicated is originally carried by the nitrocotton which is used without previous dehydration other than for the removal of excess water as by mechanical means, forms an opaque emulsion with the solvent (butyl acetate) and diluent (toluol). The emulsion thus formed may be applied to, for example, a surface, the suspended water being evaporated out in the final drying of the film. Preferably, however, the emulsion thus formed is centrifuged for the removal of the suspended water. The suspended water may be removed by adding to the emulsion an anhydrous hygroscopic salt, such, for example, as calcium or sodium chloride or nitrate or sodium sulphate, or the like, to absorb the suspended water and settling or filtering the salt out of the solution. If desired, the solution may be centrifuged and then treated with the salt or the water may be removed by any of the usual procedures for breaking emulsions. On removal of the suspended water the solution will be clear.

The solution produced by the method embodying my invention will be proof against blushing when used, since any water precipitated from the atmosphere in the drying of a film will remain in suspension, without acting to precipitate nitrocotton, and may be readily evaporated out of the film leaving it entirely clear.

It will now be observed that in accordance with my invention a clear nitrated carbohydrate solution may be produced without the necessity for dehydrating the nitrated carbohydrate prior to putting it into solution thus not only enabling the production of a clear solution and saving the cost of the relatively expensive dehydration process, but enabling the nitrated carbohydrate to be maintained wet with water, in storage and during shipment, in which condition it is substantially proof against the fire hazard.

It will be understood that according to my invention the suspended water may be permitted to remain in the solution until after the solution is applied as a film being evaporated out as the final drying operation.

What I now claim and desire to protect by Letters Patent is:

1. A lacquer free from water-miscible ingredients and capable of forming an unclouded film on evaporation of volatile ingredients including nitrocellulose, water, butyl acetate, toluol, ester gum and tricresyl phosphate, the water being emulsified in disperse phase in the liquid ingredients.

2. A lacquer free from water-miscible ingredients and capable of forming an unclouded film on evaporation of volatile ingredients including nitrated cellulose, water, a water-immiscible liquid organic solvent for the nitrated cellulose, and a water-immiscible non-solvent for the nitrated cellulose, the water being emulsified in disperse phase in the liquid ingredients.

3. A lacquer free from water-miscible ingredients and capable of forming an unclouded film on evaporation of volatile ingredients including nitrocellulose, water, butyl acetate and toluol, the water being emulsified in disperse phase in the liquid ingredients.

4. A lacquer free from water-miscible ingredients and capable of forming an unclouded film on evaporation of volatile ingredients including nitrocellulose, water, a water-immiscible organic solvent, a water-immiscible hydrocarbon diluent non-solvent for nitrocellulose, a resin and a plasticizer, the water being emulsified in disperse phase in the liquid ingredients.

GARRETT H. PETERS.